United States Patent [19]
Sugita et al.

[11] Patent Number: 5,816,104
[45] Date of Patent: Oct. 6, 1998

[54] HYDROSTATIC FEED SCREW MECHANISM AND MOVABLE BODY USING THE SAME

[75] Inventors: Kazuhiko Sugita, Anjo; Yasuo Niino, Aichi-ken; Masahiro Ido, Kariya; Toshihiko Shima, Okazaki, all of Japan

[73] Assignee: Toyoda Koki Kabushiki Kaisha, Kariya, Japan

[21] Appl. No.: 628,519

[22] Filed: Apr. 5, 1996

[30] Foreign Application Priority Data

Apr. 6, 1995 [JP] Japan .................................. 7-081241

[51] Int. Cl.⁶ .................................................. F16H 25/20
[52] U.S. Cl. ........................ 74/459; 74/424.8 R; 384/111
[58] Field of Search .............................. 74/459, 424.8 R; 384/111, 118

[56] References Cited

U.S. PATENT DOCUMENTS

| | | | |
|---|---|---|---|
| 3,493,273 | 2/1970 | Greenberg | 384/111 |
| 5,303,604 | 4/1994 | Mayfield | 74/459 |
| 5,499,942 | 3/1996 | Pflager . | |

FOREIGN PATENT DOCUMENTS

| | | |
|---|---|---|
| 0 301 779 | 2/1989 | European Pat. Off. . |
| 1 403 703 | 5/1965 | France . |
| 37 31 281 | 4/1988 | Germany . |
| 38 28 617 | 3/1990 | Germany . |
| 4115756 | 11/1992 | Germany ............................ 74/459 |
| 57-1169 | 1/1982 | Japan . |
| 59-151659 | 8/1984 | Japan ................................. 74/459 |
| 60-78153 | 5/1985 | Japan . |
| 4-157245 | 5/1992 | Japan ................................. 74/459 |
| 493578 | 2/1976 | Russian Federation ............ 74/459 |
| 1679097 | 9/1991 | Russian Federation ............ 74/459 |
| 0 914 165 | 12/1962 | United Kingdom . |
| 1 073 957 | 6/1967 | United Kingdom . |

*Primary Examiner*—Charles A. Marmor
*Assistant Examiner*—David M. Fenstermacher
*Attorney, Agent, or Firm*—Oblon, Spivak, McClelland, Maier & Neustadt, P.C.

[57] ABSTRACT

A feed screw mechanism includes a nut having a female thread, and a feed screw shaft having a male thread screw-engaged with the female thread. A thrust pocket is formed along a flank of the female thread of the nut, and pressurized fluid is supplied thereto. A plurality of separated radial pockets are formed on the crest surface of the female thread of the nut, and pressurized fluid is supplied thereto. The thrust pocket is a continuous spiral groove formed along the flank of the female thread of the nut. This structure provides sufficient rigidity in both the radial and thrust directions while reducing the size of the feed screw mechanism.

10 Claims, 6 Drawing Sheets

HYDROSTATIC FEED SCREW MECHANISM AND MOVABLE BODY USING THE SAME

BACKGROUND OF THE INVENTION

1. Field of the Invention

The present invention relates to a hydrostatic feed screw mechanism used for advancing and retracting a movable body such as a wheel head. The present invention also relates to the movable body using the hydrostatic feed screw mechanism.

2. Description of Related Art

Conventionally, a feed screw mechanism using a ball-screw has been used for moving a wheel head in a grinding machine. However, such a ball screw mechanism has a problem in case of increasing the motion speed of the wheel head. In such a feed screw mechanism, it is necessary to increase the lead of the ball screw in order to move the wheel head at a higher speed. However, when the lead is increased, the number of balls actually supporting the ball screw decreases, so that the rigidity of a nut in screw-engagement with the ball screw diminishes. Accordingly, a decrease of the rigidity makes it impossible to move the wheel head at an increased speed.

In view of the above problems, the present inventors have tried to utilize a hydrostatic feed screw in a feed screw mechanism for a wheel head. An example of a conventional hydrostatic feed screw mechanism is disclosed in Japanese Patent Application Laid-open (kokai) No. 60-78153.

In the hydrostatic feed screw mechanism disclosed in that application, groove-like hydrostatic pockets divided in the circumferential direction (hereinafter referred to as "divided hydrostatic pockets") are disposed at both ends of a female thread, while another groove-like hydrostatic pocket continuously spiraled (hereinafter referred to as "continuous spiral hydrostatic pockets") is formed in the portion except both ends thereof. In the hydrostatic feed screw mechanism having the above-described structure, the divided independent hydrostatic pockets at both ends produce rigidity in the radial and thrust directions, whereas the continuous spiral hydrostatic pocket produces rigidity in the thrust direction only.

In the conventional hydrostatic feed screw mechanism, the rigidity in the radial direction is produced by only the divided hydrostatic pockets. However, since the hydrostatic pockets are formed on slanted flanks of the female thread, hydrostatic pressure generated in the hydrostatic pockets hardly acts on the hydrostatic feed screw mechanism as a radial force. Rather, most of the hydrostatic pressure acts on it as a thrust force. Accordingly, the conventional hydrostatic feed screw mechanism cannot produce sufficient rigidity in the radial direction.

A hydrostatic feed screw mechanism shown in FIG. 1 can solve the above-described problems. In this feed screw mechanism, in addition to hydrostatic pockets 53 for the thrust direction (hereinafter referred to as "thrust pockets"), hydrostatic pockets for the radial direction (hereinafter referred to as "radial pockets"), which are formed at radial bearings 52, are provided at both ends of nuts 50 screw-engaged with a feed screw shaft 51. The radial bearings 52 directly support a crest surface of the male thread 51a of the feed screw shaft 51. All of the hydrostatic pressure generated in the radial bearings 52 acts on the feed screw shaft 51 in the radial direction, resulting in increase of the rigidity in the radial direction. However, if this structure is employed, the outer diameter of the nuts 50 must be larger than the sum of the outer diameter "a" of the feed screw shaft 51 and the thickness "b" of the radial bearings 52. Accordingly, the size of the hydrostatic feed screw mechanism becomes larger than that of conventional ones. This problem becomes more remarkable, when high speed rotation of the feed screw shaft 51 is realized by increasing the thread-height "c" of the feed screw shaft 51, namely by increasing the area for receiving hydrostatic pressure to enhance the rigidity in the thrust direction.

Besides, it is very difficult, from the viewpoint of machining the hydrostatic pockets, to form hydrostatic pockets on a bottom surface of the female thread of the nuts 50, without dividing the nuts 50 into pieces. In other words, the hydrostatic pockets in the nuts 50 cannot be so machined that it faces the crest surface of the feed screw shaft 51, as far as the nuts 50 is not divided into pieces. Therefore, in this hydrostatic feel screw mechanism, the radial bearings 52 are manufactured as separate members and then assembled into the nuts 50. This manner of separately manufacturing the radial bearings 52 requires an additional assembly step, thereby increasing costs. In addition, since the radial bearings 52 are separated into pieces, the radial bearings 52 cannot be attached near the same portion where the thrust pockets 53 are provided. Therefore, the nut 50 becomes longer than the required length.

SUMMARY OF THE INVENTION

In view of the foregoing, an object of the present invention is to provide a hydrostatic feed screw mechanism which guarantees sufficient rigidity in both the radial and thrust directions, even if it is operated at an increased speed. Also, the hydrostatic feed screw mechanism can be manufactured in size reduction besides at low costs.

Another object of the present invention is to provide a feed apparatus which utilizes the hydrostatic feed screw mechanism as set forth above in order to move a movable body at an increased speed.

According to a first aspect of the present invention, Provided is a feed screw mechanism which comprises nuts having a female thread, and a feed screw shaft having a male thread screw-engaged with the female thread. A thrust pocket is formed along a flank of the female thread of the nuts, and pressurized fluid is supplied thereto; furthermore, the thrust pocket faces a flank of the male thread of the feed screw shaft. A plurality of divided radial pockets are formed on a crest surface of the female thread of the nuts, and pressurized fluid is supplied thereto; furthermore, the radial pockets faces a bottom surface of the male thread of the feed screw shaft.

Preferably, the thrust pocket is a continuous spiral groove formed along the flank of the female thread of the nuts. Alternatively, the thrust pocket may be a plurality of divided spiral grooves.

According to a second aspect of the present invention, provided is a hydrostatic feed screw mechanism in which the male thread of the feed screw shaft is smaller in thread-width than the female thread of the nuts.

Preferably, the ratio in thread-width of the male thread of the feed screw shaft to the female thread of the nuts is smaller than $2/3$.

According to a third aspect of the present invention, a feed apparatus for a movable body is provided by utilizing the hydrostatic feed screw mechanism. The feed apparatus comprises nuts having a female thread and attached to one end of the movable body, and a feed screw shaft having a male thread and attached to a base which has a guide surface for slidably guiding the movable body. Thus, the movable body and the base are connected through the nuts and the feed screw shaft.

In the first aspect of the present invention, since the thrust pocket and the radial pockets are separately provided, sufficient rigidity can be obtained in both the radial and thrust directions. Moreover, since the radial pockets are so formed as to face the bottom surface of the male thread of the feed screw shaft, the depth of the radial pockets does not affect the size of the nuts. Therefore, the size of the nuts can be reduced. Since the thrust pocket can be provided on the flank of the female thread and the radial pockets can be provided on the crest surface of the female thread, the length of the nuts can be so shortened as to reduce the size of the feed screw mechanism. In addition, since the pockets are formed on the crest surface of the female thread, the pockets can be machined easily. As a result, it is not necessary to divide the nuts into pieces in order to machine the pockets. Therefore, in the hydrostatic feed screw mechanism, the number of its own components is minimized and its own structure is simplified.

In the second aspect of the present invention, the male thread of the feed screw shaft is smaller in thread-width than the female thread of the nuts. Consequently, the following advantages can be obtained. Since each pitch, or lead, of the male and female threads can be increased, the movable body can be moved at an increased speed. Even if the thread-height of the male thread is so increased as to extend the area of its surface for receiving the pressure from the thrust pocket, the inertia of the feed screw shaft does not increase. The reason why the inertia does not increase is that the thread-width of the male thread is small. Moreover, since the crest surface of the female thread has an increased thread-width, the area of the surface for receiving the pressure from the radial pockets can be increased in the female thread; accordingly, an increased rigidity can be obtained in the radial direction. Further, the widened crest surface of the female thread facilitates the formation of the radial pockets.

In the third aspect of the present invention, since the movable body is moved by utilizing the hydrostatic feed screw mechanism according to the first aspect of the present invention, sufficient rigidity can be obtained in both the radial and thrust directions. Consequently, even if the lead of the male and female threads are increased, such rigidity can be obtained; accordingly the, movable body can be moved at an increased speed.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

An embodiment of the present invention will now be described with reference to the drawings.

Figure 1:
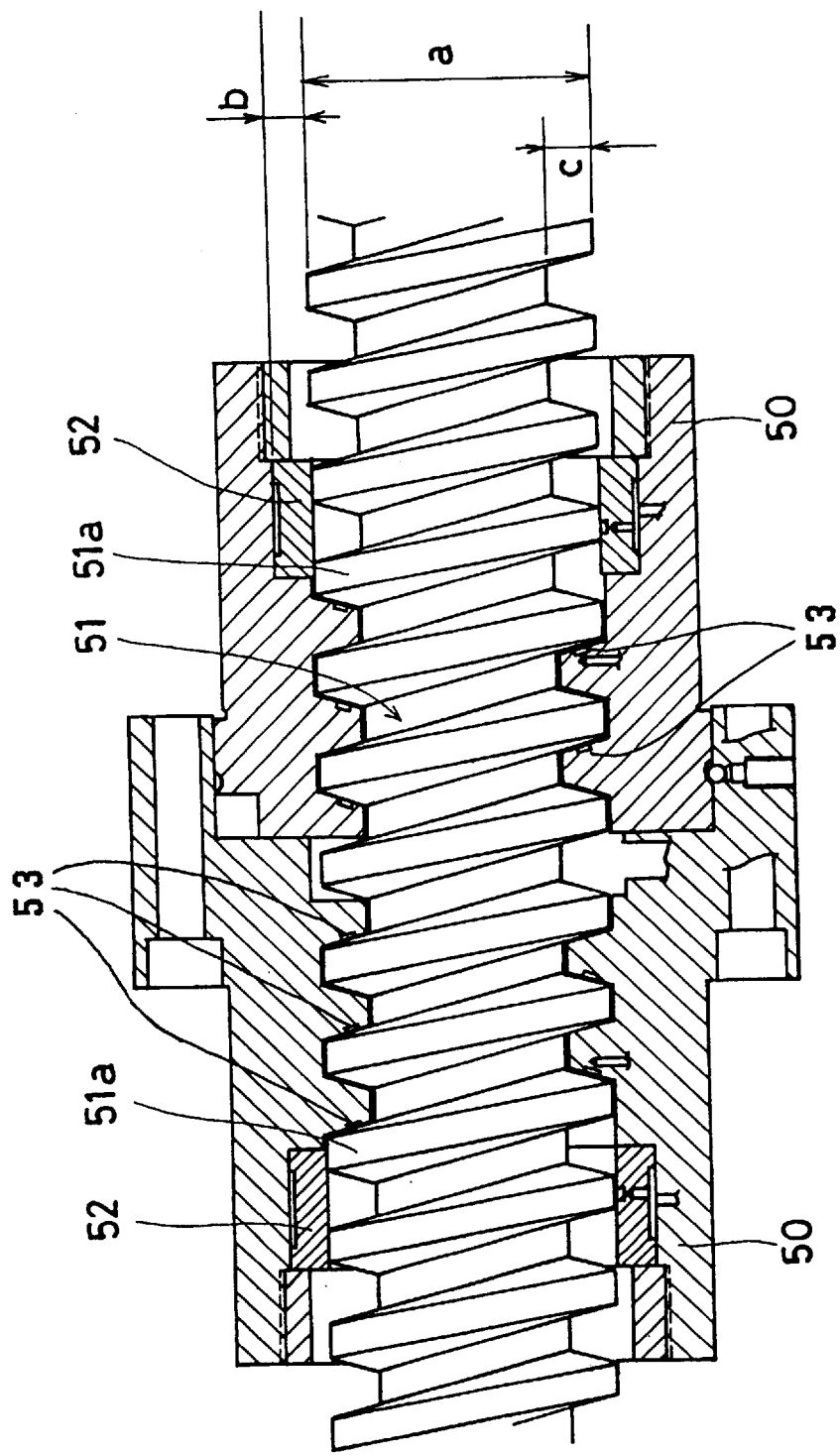
FIG. 1 is a sectional view showing a conventional hydrostatic feed screw mechanism.
Figure 2:
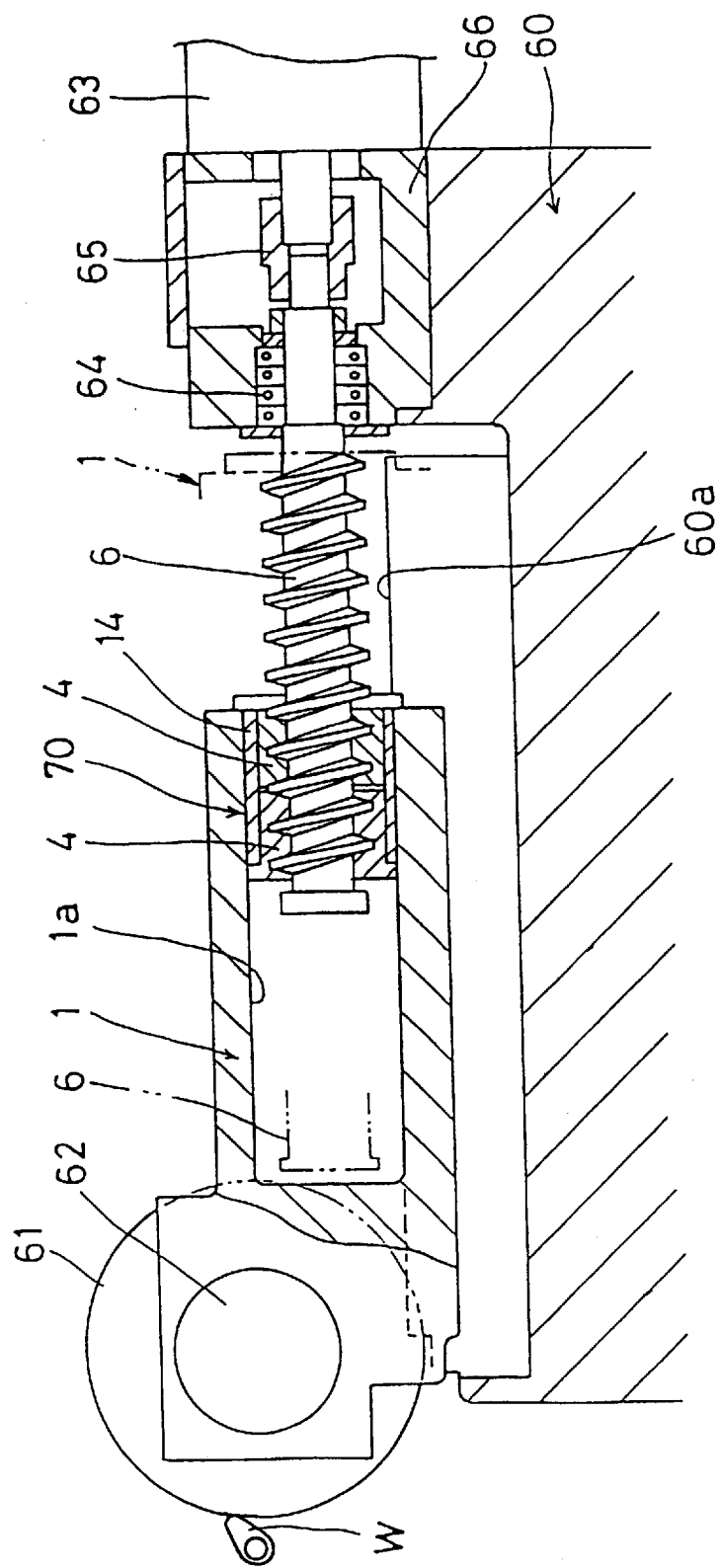
FIG. 2 is a sectional view showing the overall structure of a feed apparatus for a movable body according to an embodiment of the present invention.

Referring to FIG. 2, a wheel head 1, which is moved by a feed screw mechanism, is shown and corresponds to a movable body. The wheel head 1 is advanced and retracted in order to grind a workpiece W, such as a cam shaft, which is rotatably supported by an unillustrated ordinary means. The wheel head 1 is supported and guided by a guide surface 60a provided on a base 60 for movement in the horizontal direction shown in FIG. 2. A grinding wheel 61, that is a tool for grinding the workpiece W, is rotatably supported at the front end portion of the wheel head 1. The grinding wheel 61 is rotated by a servomotor 62 which is connected to a rotational shaft of the grinding wheel 61.

A cavity la is formed in the wheel head 1 so as to extend from the rear end of the wheel head 1 toward the front end thereof. A hydrostatic feed screw mechanism 70 is attached to the open end of the cavity 1a, so that the wheel head 1 advances and retracts therein relative to a feed screw shaft 6. The hydrostatic feed screw mechanism 70 is mainly composed of a pair of nuts 4 and the feed screw shaft 6. Provided at the rear end portion of the base 60 is a mounting block 66 to which a servomotor 63 for rotating the feed screw shaft 6 is attached. In detail, ball bearings 64 are built into the front end of the mounting block 66 so as to rotatably support the rear end of the feed screw shaft 6, while the servomotor 63 is attached to the rear end of the mounting block 66. The rear end of the feed screw shaft 6 and the servomotor 63 are connected with each other via a coupling 65 disposed within the mounting block 66.

Figure 3:
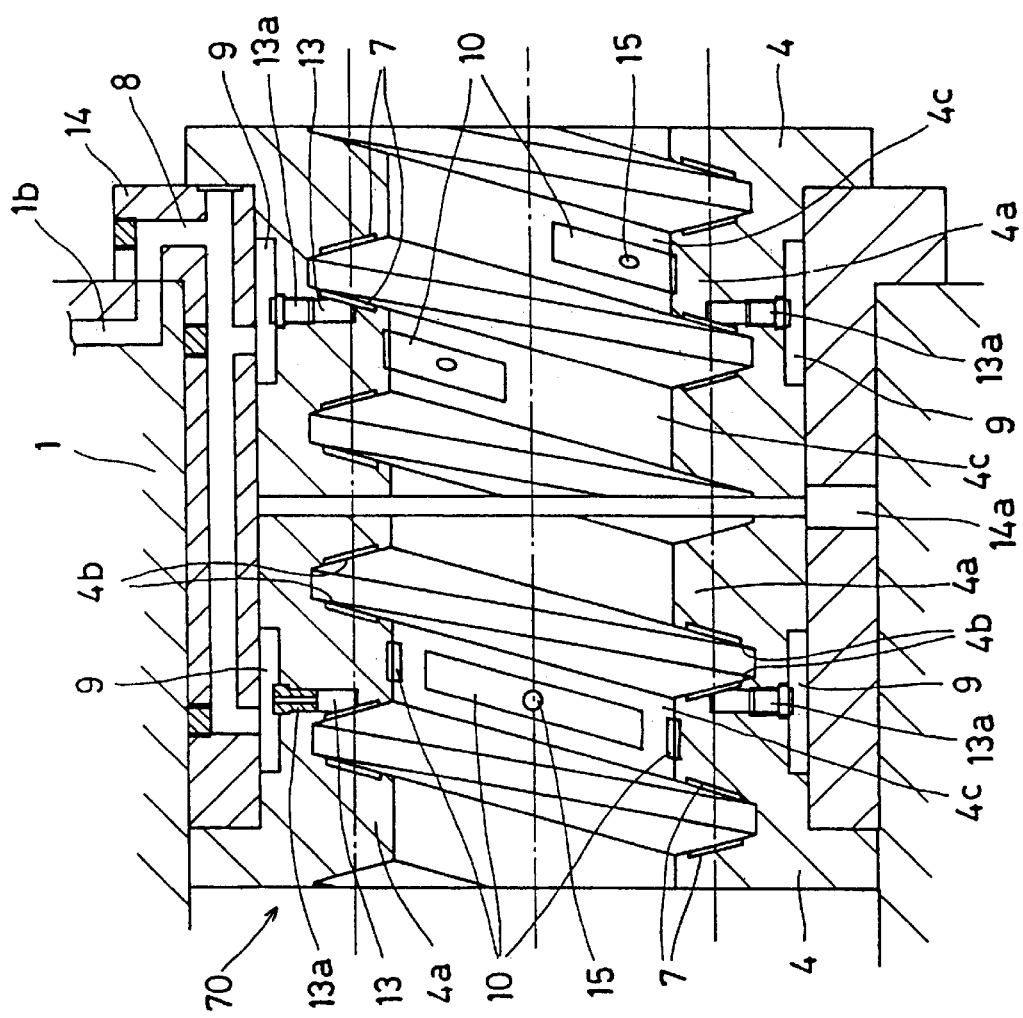
FIG. 3 is a sectional view of a hydrostatic feed screw mechanism according to the embodiment of the present invention.
Figure 4:
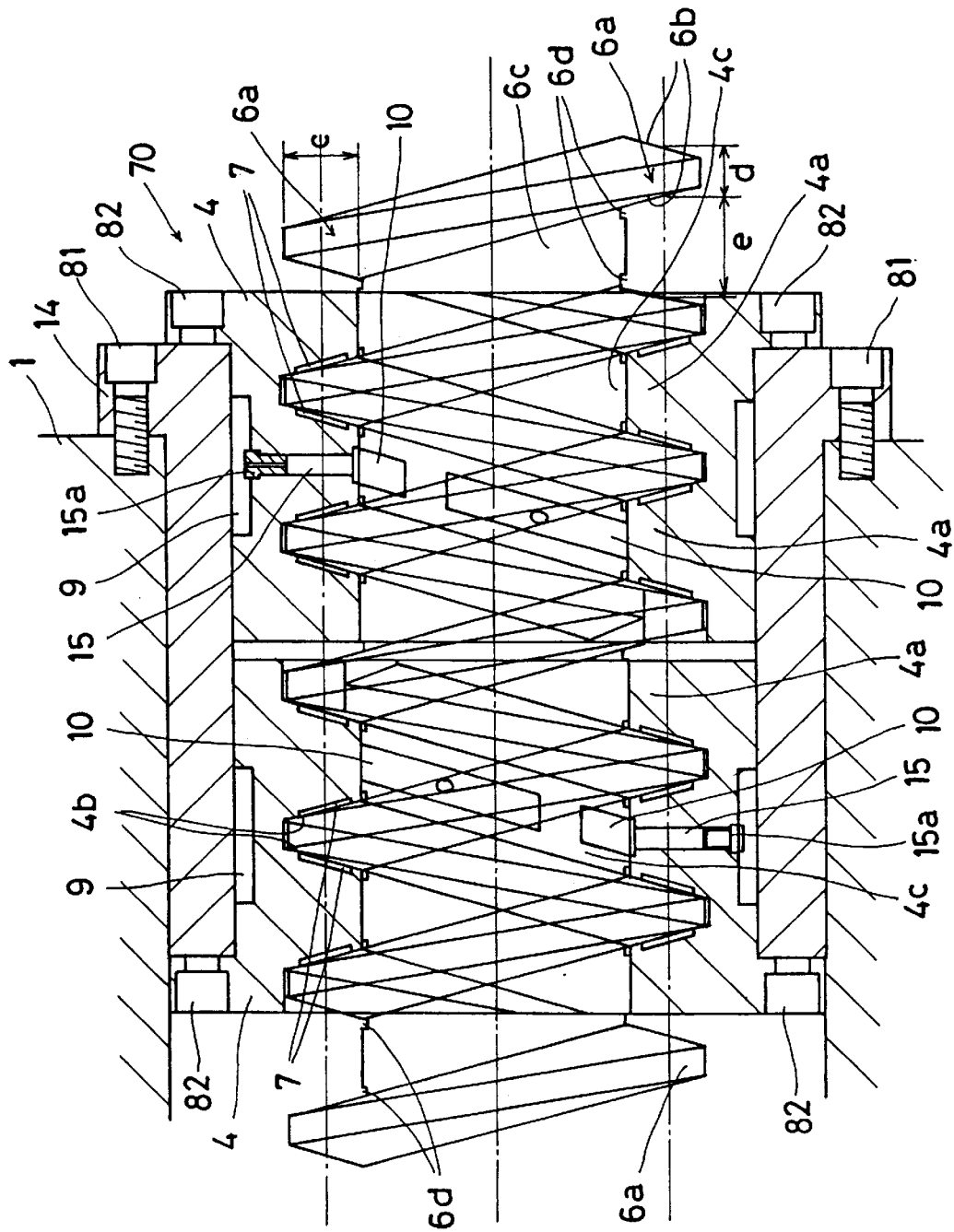
FIG. 4 is another sectional view of the hydrostatic feed screw mechanism according to the embodiment, depicting it in a different angular phase from FIG. 3.
Figure 5:
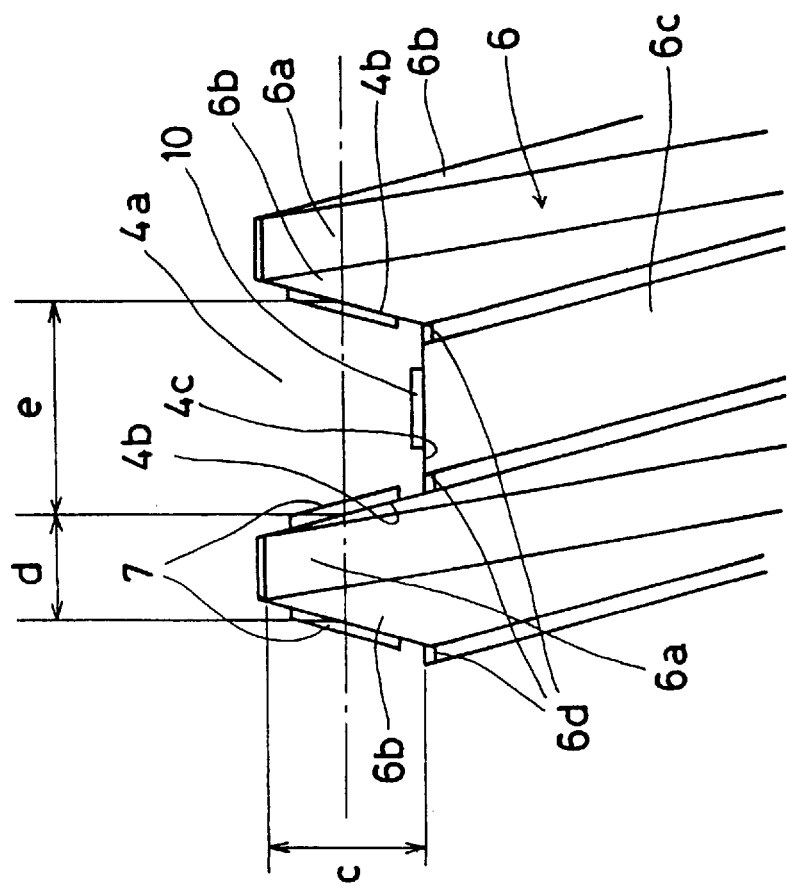
FIG. 5 is a detailed view enlarging the portion where nuts and the feed screw shaft are engaged with each other.
Figure 6:
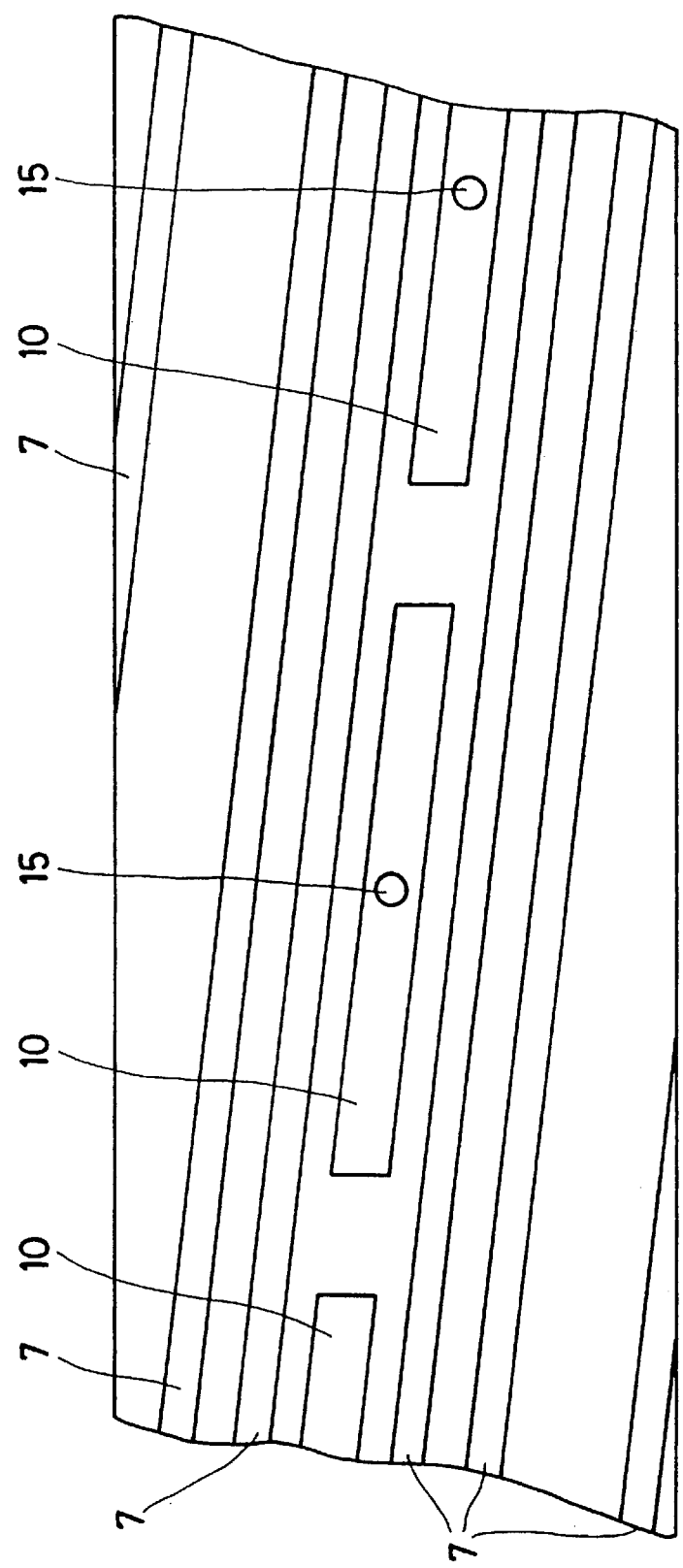
FIG. 6 is a schematic partial development of the inner surface of the nuts shown in FIG. 2 in order to show the arrangement of thrust and radial pockets.

Next, the hydrostatic feed screw mechanism 70 will be described with reference to FIGS. 3–6. FIG. 3 and FIG. 4 show cross sectional views of the feed screw mechanism 70, each depicting it in a different angular phase. Besides, FIG. 3 shows the inner surfaces of the nuts 4 with the feed screw shaft 6 omitted, while FIG. 4 shows the inner surfaces of the nuts 4 as if looking through the feed screw shaft 6. The hydrostatic feed screw mechanism 70 has a tubular support member 14 which is press-fitted into the cavity 1a of the wheel head 1, and the pair of nuts 4 are fitted into the support member 14 from both ends thereof. The feed screw shaft 6 is screw-engaged with their nuts 4. The support member 14 is fixed to the wheel head 1 by using bolts 81, as it was shown in FIG. 4, and similarly, the nuts 4 are fixed to the support member 14 by using bolts 82.

Furthermore, a description will be given relating to the feed screw shaft 6. As it was shown in FIG. 4, the feed screw shaft 6 has a male thread 6a whose a cross section is a trapezoid. The male thread 6a is so designed as to increase the lead in order to obtain rigidity thereof. Hence, the thread-width "d" of the male thread 6a of the feed screw shaft 6 is determined to be smaller than the thread-width "e" of the female thread 4a of the nut 4. Specifically, the thread-widths "d" and "e" are so set that the ratio d/e is smaller than $2/3$. Thus, the lead, or the pitch of the male and female threads 6a and 4a, are increased by setting this ratio. In more detail, the thread-height "c" is so designed as to be large in order to increase the area for receiving pressure from thrust pockets 7. Although this structure tends to increase the inertia of the feed screw shaft 6 due to a increase in thread-height "c", in fact, the inertia is prevented from increasing as a result of a decrease in thread-width "d".

Two kinds of hydrostatic pockets, i.e., the above-mentioned thrust pockets 7 and a plurality of radial pockets 10 are provided in the hydrostatic feed screw mechanism 70. The thrust pockets 7 produce hydrostatic support effect in the thrust direction, and the radial pockets 10 also produce hydrostatic support effect in this radial direction. As it was shown in FIG. 6, the thrust pockets 7 are formed on the flanks 4b of the female thread 4a so as to form continuous spiral grooves, so that the thrust pockets 7 face the flanks 6b of the male thread 6a. As it was shown in FIG. 3, the thrust pockets 7 are connected to outer circumferential grooves 9, which are formed on the outer surfaces of the nuts 4, via thrust supply passages 13 provided in the nuts 4. The outer circumferential grooves 9 are connected to an unillustrated pressurized fluid source such as a pump via a supply passage 8, which is provided in the support member 14 and connects to a supply passage 1b provided in the wheel head 1. A throttle 13a is provided with each of the thrust supply passages 13.

As shown in FIG. 4, a group of the radial pockets 10 is formed on the crest surface 4c of the female thread 4a of each nut 4. The two groups of the radial pockets 10 support the feed screw shaft 6 with the nuts 4 engaging with the feed screw shaft 6. In detail, each group includes a configuration in which three radial pockets 10 exist within one pitch of the spiral, namely within an angular range of 360°. The radial pockets 10 are connected to the outer circumferential grooves 9 of the nuts 4 via radial supply passages 15 in such a manner as the thrust pockets 7. The outer circumferential grooves 9 are connected to the pressurized fluid source via the supply passage 8 in the support member 14. Each of the radial supply passages 15 is provided with a throttle 15a.

Pressurized fluid which is supplied from the supply passage 8 to both the radial pockets 10 and the thrust pockets 7 via the outer circumferential grooves 9, is drained to the outside of the nuts 4 via clearances between the nuts 4 and the feed screw shaft 6. To smoothly drain the pressurized fluid, drain grooves 6d are spirally formed on the bottom surface 6c of the male thread 6a of the feed screw shaft 6 so as to extend along the thread ridge thereof. Fluid drained from the nuts 4 is collected into an unillustrated fluid collecting groove provided on the base 60 shown in FIG. 2 for circulating it. As it was shown in FIG. 3, a drain hole 14a is provided in the support member 14. In detail, the drain hole 14a is formed at a portion in between the nuts 4, so that the fluid is collected at the portion in between the nuts 4 and is drained to the unillustrated fluid collecting groove via the drain hole 14a.

Next, the operation of the present embodiment will be described.

When the feed screw shaft 6 is rotated by the servomotor 63, the wheel head 1 moves along the guide surface 60a. At this time, the unillustrated pressurized fluid supply source is driven, so that pressurized fluid is supplied to the thrust pockets 7 via the supply passage 8, the outer circumferential grooves 9, the thrust supply passages 13, and the throttles 13a. Similarly, the pressurized fluid is simultaneously supplied to the radial pockets 10 via the supply passage. 8, the outer circumferential grooves 9, the radial supply passages 15, and the throttles 15a. As a result, the thrust pockets 7 form hydraulic films of pressurized fluid in the slight clearance between the flanks 6b of the male thread 6a of the feed screw shaft 6 and the flanks 4b of the female threads 4a of the nuts 4. Similarly, the radial pockets 10 form hydraulic films of pressurized fluid in the slight clearance between the bottom surface 6c of the male thread 6a of the feed screw shaft 6 and the crest surface 4c of the female threads 4a of the nuts 4.

At this time, with the result that the hydrostatic pressure of the thrust pockets 7 functions as the centralizing effects, the crest surface 6a of the male thread of the feed screw shaft 6 is positioned approximately at the center between the adjacent flanks 4b. As a result, the rigidity in the thrust direction is enhanced. Similarly, with the result that the hydrostatic pressure of the radial pockets 10 also functions as the centralizing effects, the center axis of the feed screw shaft 6 is caused to coincide with the center axes of the nuts 4. As a result, the rigidity in radial direction is also enhanced. In this way, sufficient rigidity can be obtained in both the thrust and radial directions. Therefore, the wheel head 1 can be moved at an increased speed with the rigidity maintaining.

As described above, in the present embodiment, the thrust pockets 7 are formed along the flanks 4b of the female threads 4a of the nuts 4 so as to form continuous spirals. Accordingly, the thrust pockets 7 serve as a dedicated hydrostatic pockets for obtaining the rigidity in the thrust direction, so that most of the hydrostatic pressure generated by the hydrostatic pockets acts in the thrust direction. However, the thrust pockets 7 each having a spiral shape may be partly or completely divided into a plurality of spiral pockets, or grooves. In this case, the divided spiral pockets produce the hydrostatic pressure in the radial direction as well as the hydrostatic pressure in the thrust direction.

In the present embodiment, the thrust pockets 7 is formed on both sides of flanks 4b of the female thread 4a. However, the thrust pocket 7 may be formed on only one side of the flanks 4b of the female thread 4a. In this case, one thrust pocket 7 is formed on one side of flanks 4b in the one of the pair of nuts 4, while another thrust pocket 7 is formed opposite on the other side of flanks 4b in the other of the pair of nuts 4.

In the above-described embodiment, the feed screw shaft 6 is rotated by the servomotor 62 disposed on the base 60 so as to advance and retract the movable body, i.e., wheel head 1. However, a structure of the movable body may be so employed that the servomotor is disposed on the movable body, while the feed screw shaft is fixed to the base. Thus, the nuts provided on the movable body are rotated by the servomotor in order to advance and retract the movable body.

Obviously, numerous modifications and variations of the present invention are possible in light of the above teachings. It is therefore to be understood that within the scope of the appended claims, the present invention may be practiced otherwise than as specifically described herein.

What is claimed is:

1. A feed screw mechanism comprising:
   a nut having a female thread;
   a feed screw shaft having a male thread screw-engaged with said female thread;
   a thrust pocket which is formed along a flank of the female thread of said nut and to which pressurized fluid is supplied, said thrust pocket facing a flank of the male thread of said feed screw shaft; and
   a plurality of independent radial pockets which are formed on the crest surface of the female thread of said nut and to which pressurized fluid is supplied, said independent radial pockets facing the bottom surface of the male thread of said feed screw shaft.

2. A feed screw mechanism according to claim 1, wherein said thrust pocket is formed into a continuous spiral groove along the flank of the female thread of said nut.

3. A feed screw mechanism according to claim 1, wherein said thrust pocket is formed into a plurality of independent spiral grooves along the flank of the female thread of said nut.

4. A feed screw mechanism according to claim 1, wherein the male thread of said feed screw shaft is smaller in thread-width than the female thread of said nut.

5. A feed screw mechanism according to claim 4, wherein the ratio in thread-width of the male thread of said feed screw shaft to the female thread of said nut is smaller than $2/3$.

6. A movable body feed apparatus comprising:

a nut having a female thread and attached to one of a movable body and a base which has a guide surface for slidably guiding said movable body;

a feed screw shaft having a male thread screw-engaged with said female thread, said feed screw shaft being attached the other of said movable body and said base;

a thrust pocket which is formed along a flank of the female thread of said nut and to which pressurized fluid is supplied, said thrust pocket facing a flank of the male thread of said feed screw shaft; and a plurality of independent radial pockets which are formed on the crest surface of the female thread of said nut and to which pressurized fluid is supplied, said independent radial pockets facing the bottom surface of the male thread of said feed screw shaft.

7. A feed screw mechanism according to claim 6, wherein said thrust pocket is formed into a continuous spiral groove along the flank of the female thread of said nut.

8. A feed screw mechanism according to claim 6, wherein said thrust pocket is formed into a plurality of independent spiral grooves along the flank of the female thread of said nut.

9. A feed screw mechanism according to claim 6, wherein the male thread of said feed screw shaft is smaller in thread-width than the female thread of said nut.

10. A feed screw mechanism according to claim 6, wherein the ratio in thread-width of the male thread of said feed screw shaft to of the female thread of said nut is smaller than $2/3$.

* * * * *